United States Patent
Ogami et al.

(10) Patent No.: US 9,730,130 B2
(45) Date of Patent: Aug. 8, 2017

(54) MOBILE COMMUNICATION SYSTEM, HANDOVER CONTROL METHOD, RADIO BASE STATION, AND MOBILE STATION

(75) Inventors: Tadashi Ogami, Tokyo (JP); Sadafuku Hayashi, Tokyo (JP); Mazlyn Mona Mustapha, Surrey (GB)

(73) Assignee: NEC CORPORATION, Minato-ku, Tokyo (JP)

(*) Notice: Subject to any disclaimer, the term of this patent is extended or adjusted under 35 U.S.C. 154(b) by 1087 days.

(21) Appl. No.: 11/943,663

(22) Filed: Nov. 21, 2007

(65) Prior Publication Data

US 2008/0153495 A1 Jun. 26, 2008

(30) Foreign Application Priority Data

Dec. 20, 2006 (JP) .................................. 2006/342024

(51) Int. Cl.
*H04W 36/30* (2009.01)
*H04W 36/38* (2009.01)

(52) U.S. Cl.
CPC ............ *H04W 36/30* (2013.01); *H04W 36/38* (2013.01)

(58) Field of Classification Search
CPC ..... H04W 24/00; H04W 36/18; H04W 36/30; H04W 36/0083; H04W 36/0066; H04W 36/14; H04W 16/04; H04W 16/12; H04W 16/32; H04W 84/045; H04W 52/265; H04W 88/08; H04W 92/20; H04W 48/20; H04W 52/0206; H04W 72/0426; H04W 72/085; H04W 36/00; H04W 36/0022; H04W 36/0061; H04W 36/0072; H04W 36/165; H04W 36/20; H04W 36/22; H04W 36/24; H04W 36/32; H04W 48/10;
(Continued)

(56) References Cited

U.S. PATENT DOCUMENTS 6,006,077 A * 12/1999 Shull .......................... 455/226.2
6,104,936 A * 8/2000 Kronestedt ................ 455/562.1
(Continued)

FOREIGN PATENT DOCUMENTS

EP 1 071 305 A2 1/2001
EP 1432262 A1 6/2004
(Continued)

OTHER PUBLICATIONS

Joint RAN2-RAN3 #48bis LTE Canes, France, Oct. 11-14, 2005 Agenda Item: 6.1 Source: NEC, NTT DoCoMo Title: EUTRAN handover procedure for LTE_Active.*
(Continued)

*Primary Examiner* — Nizar Sivji
(74) *Attorney, Agent, or Firm* — Sughrue Mion, PLLC

(57) ABSTRACT

A mobile communication system according to an exemplary aspect of the invention is a mobile communication system including a mobile station, a radio base station as a handover source of the mobile station, and a radio base station as a handover target of the mobile station, wherein the mobile station includes a transmission unit for transmitting radio quality information between the mobile station and the radio base station as the handover target to the radio base station as the handover source; and the radio base station as the handover source includes a transmission unit for transmitting the radio quality information to the radio base station as the handover target.

11 Claims, 12 Drawing Sheets

(58) Field of Classification Search
CPC ... H04W 48/12; H04W 48/18; H04W 64/003; H04W 72/005; H04B 10/07955; H04B 17/0057; H04L 5/006; H04L 1/0026; H04L 67/322; H04J 14/0221; H01Q 1/246
USPC .......................... 370/332, 331; 455/436–444
See application file for complete search history.

(56) References Cited

U.S. PATENT DOCUMENTS

| | | | |
|---|---|---|---|
| 6,965,585 B2* | 11/2005 | Grilli et al. | 370/331 |
| 6,985,736 B1* | 1/2006 | Aalto | 455/447 |
| 7,650,143 B2* | 1/2010 | Jagadeesan et al. | 455/417 |
| 2002/0093922 A1* | 7/2002 | Grilli et al. | 370/328 |
| 2004/0147262 A1* | 7/2004 | Lescuyer et al. | 455/434 |
| 2005/0096051 A1* | 5/2005 | Lee et al. | 455/438 |
| 2005/0272403 A1* | 12/2005 | Ryu et al. | 455/403 |
| 2005/0282546 A1* | 12/2005 | Chang et al. | 455/436 |
| 2006/0281461 A1* | 12/2006 | Kwun et al. | 455/436 |
| 2007/0081492 A1* | 4/2007 | Petrovic | H04L 1/1812 370/331 |
| 2007/0099561 A1* | 5/2007 | Voss | 455/12.1 |
| 2008/0089292 A1* | 4/2008 | Kitazoe | H04L 1/1829 370/331 |
| 2008/0198808 A1* | 8/2008 | Hwang | H04W 36/06 370/331 |
| 2009/0180437 A1* | 7/2009 | Kanazawa | 370/331 |
| 2010/0273487 A1* | 10/2010 | Alonso-Rubio | H04W 36/385 455/436 |
| 2011/0044290 A1* | 2/2011 | Kanazawa | 370/332 |
| 2013/0040692 A1* | 2/2013 | Chen | H04W 36/0094 455/525 |
| 2015/0245407 A1* | 8/2015 | Johansson | H04W 48/17 370/329 |

FOREIGN PATENT DOCUMENTS

| | | |
|---|---|---|
| EP | 1519519 A1 * | 3/2005 |
| EP | 1 732 269 A1 | 12/2006 |
| EP | 1 843 620 A2 | 10/2007 |
| JP | 2001-078246 A | 3/2001 |
| KR | 20050089627 A | 9/2005 |
| KR | 10-2006-0128542 A | 12/2006 |
| WO | WO 92/01339 A1 | 1/1992 |
| WO | 01/35548 A1 | 5/2001 |
| WO | 2008/052012 A2 | 5/2008 |

OTHER PUBLICATIONS

"3GPP TSG-RAN WG3 Meeting #50, Sophia Antipolis, France, Jan. 10-12, 2006, R3-060012".
European Search Report, dated Jun. 16, 2011, issued in Application No. 07022595.8.
"Key Issue Optimized MM", 3GPP Draft; R3-060012-INTRA-HO, 3rd Generation Partnership Project (3GPP), vol. RAN WG3, Mtg. #50, Sophia Antipolis, France; Jan. 4, 2006, XP050158948, 14 pages.
Office Action dated Oct. 29, 2013, issued by the Japanese Patent Office in corresponding Application No. 2013-025074.
"Updates to Intra-LTE handover in 36.300", 3GPP TSG-RAN WG3 #54, Tdoc. R3-061788, Nov. 6-10, 2006, 11. 10, pp. 1-4.
Office Action, dated Dec. 3, 2013, issued by the Japanese Patent Office, in counterpart Application No. 2012-75310.
Communication dated Feb. 1, 2016 from the State Intellectual Property Office of the P.R.C. issued in corresponding Application No. 201310117216.1.
"Random access for less-contention-based handover", 3GPP TSG-RAN-WG1 Meeting #46bis, R1-062893, 3GPPTSG-RAN-WG2 Meeting #55, R2-062886, Fujitsu, Seoul, Korea, Oct. 9-13, 2006, 14 pages total.
"Less-contention-based handover", 3GPP TSG-RAN-WG2 Meeting #56, R2-063325, Fujitsu, Riga, Latvia, Nov. 6-10, 2006, 7 pages total.
"Evolved Universal Terrestrial Radio Access (E-UTRA) and Evolved Universal Terrestrial Radio Access Network (E-UTRAN); Radio Interface Protocol Aspects (Release 7)," 3GPP TR 25.813 v7.1.0, Technical Report, 3rd Generation Partnership Project, Technical Specification Group Radio Access Network, Sep. 2006, 41 pages total.
"Evolved Universal Terrestrial Radio Access (E-UTRA) and Evolved Universal Terrestrial Radio Access Network (E-UTRAN); Overall Description; Stage 2, (Release 8)," 3GPP TS 36.300 V0.3.1, Technical Specification, 3rd Generation Partnership Project, Technical Specification Group Radio Access Network, 2006-11, 72 pages total.
Communication dated Feb. 1, 2016 from the Canadian Intellectual Property Office issued in corresponding Application No. 2,612,045.

* cited by examiner

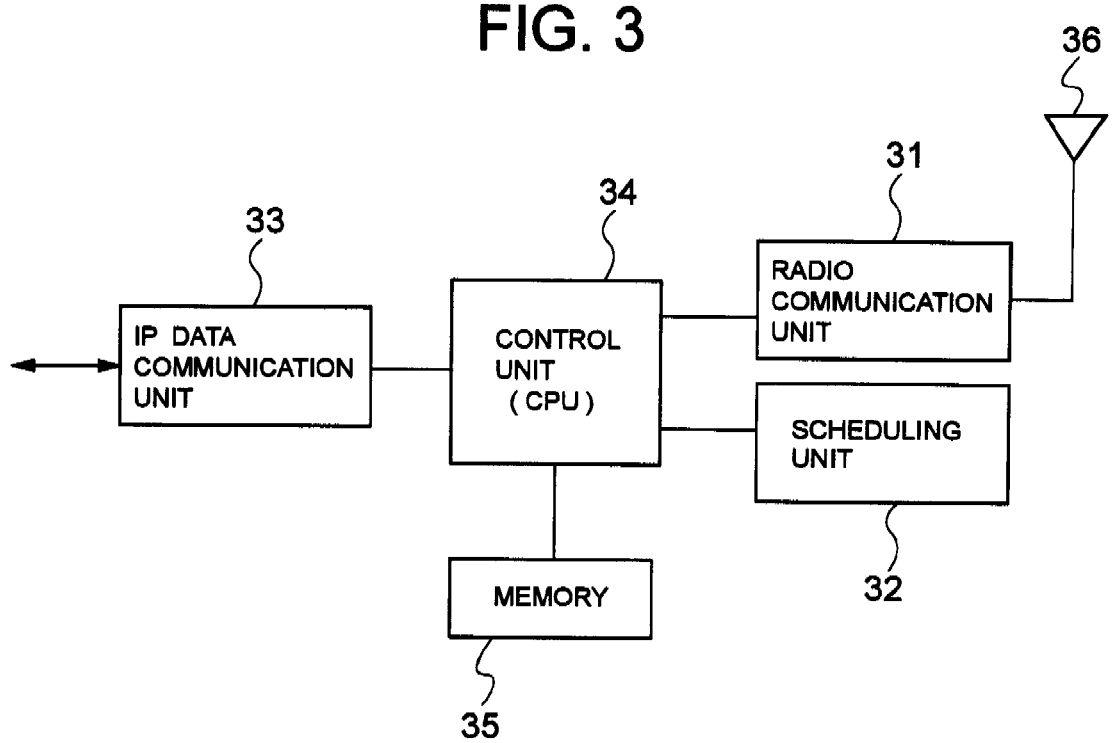
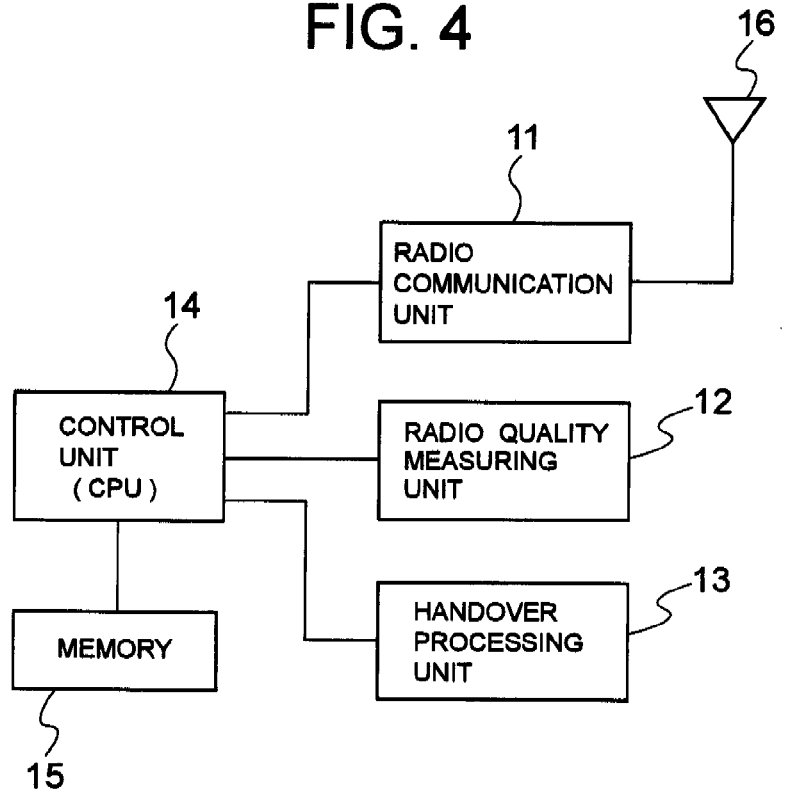

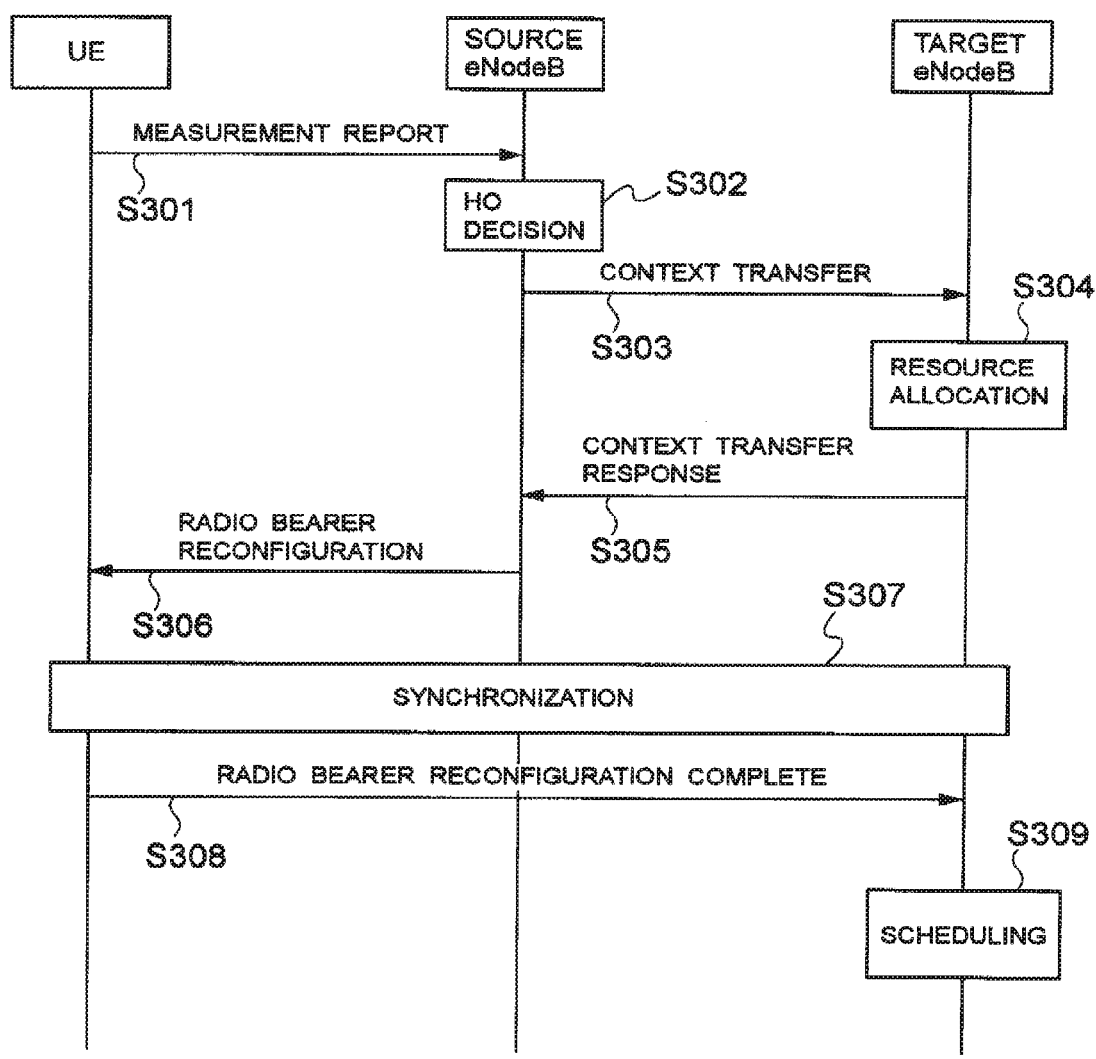

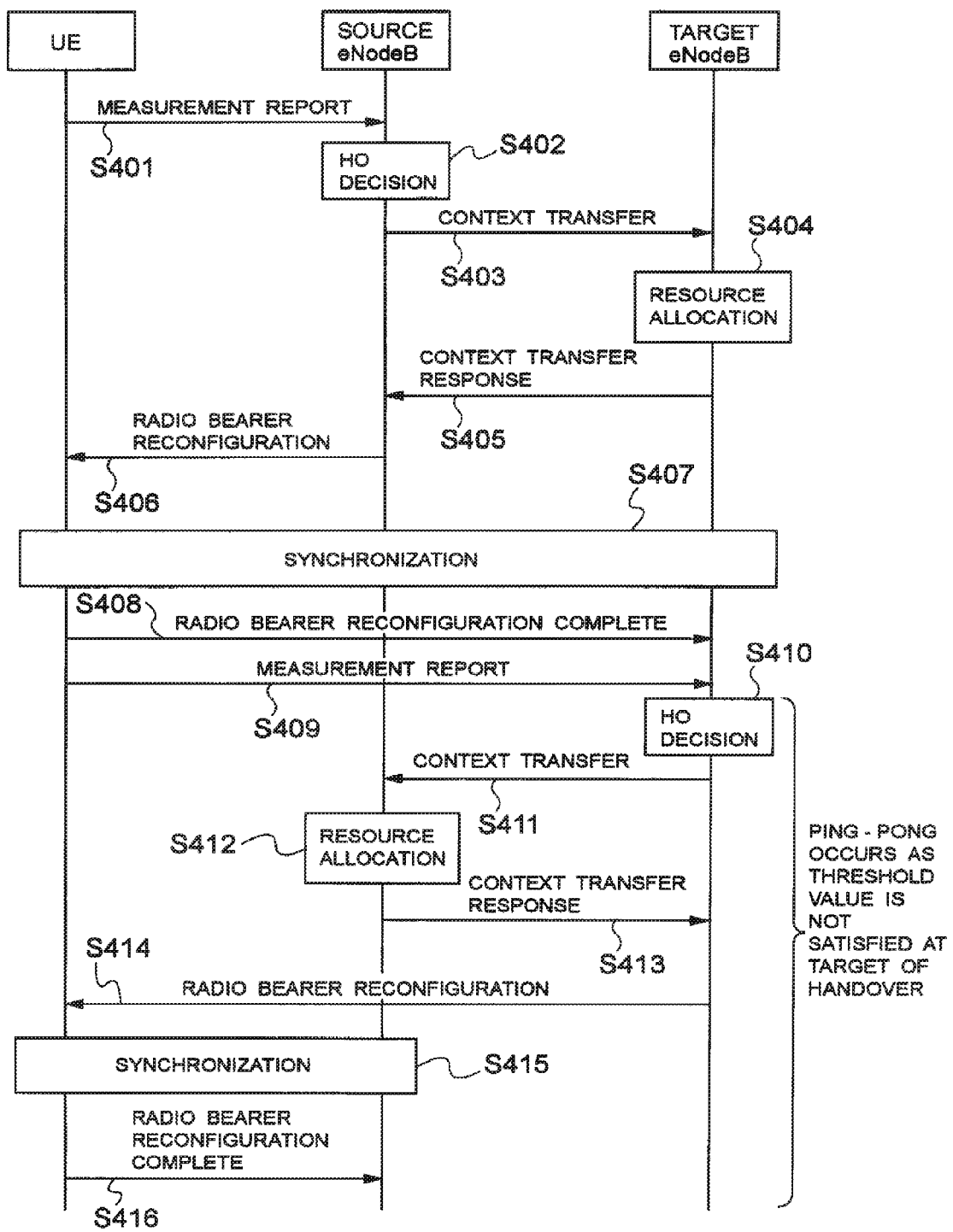
PRIOR ART FIG. 13

MOBILE COMMUNICATION SYSTEM, HANDOVER CONTROL METHOD, RADIO BASE STATION, AND MOBILE STATION

INCORPORATION BY REFERENCE

This application is based upon and claims the benefit of priority from Japanese patent application No. 2006-342024, filed on Dec. 20, 2006, the disclosure of which is incorporated herein in its entirety by reference.

BACKGROUND OF THE INVENTION

Field of the Invention

The present invention relates to a mobile communication system, a handover control method, a radio base station, and a mobile station. More particularly, the present invention relates to a mobile communication system in which a mobile station measures radio quality information between the mobile station and radio base stations and a radio base station as the source of handover decides the handover of the mobile station to a radio base station as the target of handover based on the result of the measurement so as to carry out a handover.

Description of the Related Art

The Super 3G (LTE or Long Term Evolution) system is considering transfer of data from a Source eNodeB which is a radio base station as the handover source to a Target eNodeB which is a radio base station as the handover target to realize a handover without data loss when a serving cell changes before and after a handover.

FIG. 12 is a sequence diagram illustrating the procedure of a handover of a related art (see 3GPP R3-060012, p. 6, "FIG. 6: Inter pool area HO sequence 1 (Active mode) for data communication terminal", 10-12, Jan. 2006, for instance). In FIG. 12, a UE as a mobile station periodically measures radio quality between the UE and neighboring eNodeBs, and reports the result of the measurement to the Source eNodeB as a Measurement Report (step S301).

Based on the Measurement Report from the UE, the Source eNodeB determines whether to carry out a handover or not (step S302). When a handover is to be carried out, the Source eNodeB notifies the Target eNodeB of parameters for use at the Target eNodeB, such as UE information managed at the Source eNodeB, that is, context information necessary for communication with the UE, and gives a trigger to reserve radio resource of the Target eNodeB (step S303).

The Target eNodeB determines whether there is available radio resource or not (step S304), and if radio resource can be allocated to the UE, it notifies the Source eNodeB of completion of radio resource reservation (step S305). After radio resource of the Target eNodeB is reserved, the Source eNodeB notifies the UE of the parameters for use at the handover target (step S306). After the UE receives the parameters for use at the handover target, the UE and the Target eNodeB start operations for achieving synchronization (step S307).

After achieving synchronization, the UE notifies the Target eNodeB of completion of handover processing (step S308). After the handover processing, the Target eNodeB uses predefined radio resource to allocate a shared channel to the UE (step S309).

International Patent Publication No. WO92/01339 describes that a mobile station measures the strength of signals from neighboring base stations, and a base station as the source of handoff transfers measurement information pertaining to a base station as the target of handoff to the target base station when the mobile station is handed off to the target base station. This transfer is performed for the purpose of enabling a handoff with no waiting time when the mobile station is handed off from the target base station to other cell immediately after a handoff. That is to say, the target base station utilizes the transferred information for determining whether a handoff is necessary or not immediately after a handoff.

However, the sequence of a handover shown in FIG. 12 has such problems as follows.

A first problem is that optimal radio resource is likely not to be selected for a radio quality between the Target eNodeB and the UE for a while after the completion of a handover because the Target eNodeB does not have radio quality information between the Target eNodeB and the UE in relation to allocation of a shared channel to the UE by the Target eNodeB.

A second problem is possible occurrence of a handover sequence to other cell including the Source eNodeB immediately after a handover, as illustrated in FIG. 13. This is because, due to lack of radio quality information between the Target eNodeB and the UE at the Target eNodeB, the radio quality between the Target eNodeB and the UE does not meet conditions for accepting a handover in terms of the algorithm of the Target eNodeB, especially when the Source eNodeB and the Target eNodeB adopt different algorithms for handover decision (e.g., when the UE is handed over between eNodeBs from different vendors or operators). This phenomenon is also called a ping-pong phenomenon.

FIG. 13 is a sequence diagram illustrating the ping-pong phenomenon. As steps S401 through S408 of FIG. 13 are similar to steps S301 through S308 of FIG. 12, description of them is omitted.

In FIG. 13, after the handover of the UE to the Target eNodeB is completed (step S408), the Target eNodeB determines whether to carry out a handover to other cell or not based on a Measurement Report from the UE (step S409) as well as an algorithm of the Target eNodeB for handover decision. Here, if the radio quality between the Target eNodeB and the UE does not satisfy conditions for accepting a handover on the Target eNodeB, the Target eNodeB decides a handover to other cell immediately after the handover (step S410). As a result, a handover to other cell (in FIG. 13, the Source eNodeB) is performed again immediately after a handover is completed (steps S411 through S416). This is the ping-pong phenomenon. Steps S411 through S416 correspond to steps S403 through S408.

BRIEF SUMMARY OF THE INVENTION

An exemplary object of the present invention is to provide a mobile communication system, a handover control method, a radio base station, and a mobile station for solving at least one of the first and second problems outlined above.

A first exemplary object of the present invention is to provide a mobile communication system, a handover control method, a radio base station, and a mobile station that can improve the correctness of channel allocation to a mobile station by a radio base station as the handover target.

A second exemplary object of the present invention is to provide a mobile communication system, a handover control method, a radio base station, and a mobile station that can avoid a ping-pong phenomenon.

A mobile communication system according to an exemplary aspect of the invention is a mobile communication system including a mobile station, a radio base station as a handover source of the mobile station, and a radio base station as a handover target of the mobile station, wherein the mobile station includes a first transmission unit for transmitting radio quality information between the mobile station and the radio base station as the handover target to the radio base station as the handover source; the radio base station as the handover source includes a second transmission unit for transmitting the radio quality information to the radio base station as the handover target when the mobile station is handed over from the radio base station as the handover source to the radio base station as the handover target; and the radio base station as the handover target includes a reception unit for receiving the radio quality information from the radio base station as the handover source, and a channel allocation unit for allocating a channel to the mobile station in accordance with the radio quality information.

A handover control method according to an exemplary aspect of the invention is a handover control method for a mobile communication system that includes a mobile station, a radio base station as a handover source of the mobile station, and a radio base station as a handover target of the mobile station, the method including: transmitting radio quality information between the mobile station and the radio base station as the handover target from the mobile station to the radio base station as the handover source; transmitting the radio quality information from the radio base station as the handover source to the radio base station as the handover target when the mobile station is handed over from the radio base station as the handover source to the radio base station as the handover target; receiving the radio quality information from the radio base station as the handover source at the radio base station as the handover target; and allocating a channel to the mobile station at the radio base station as the handover target in accordance with the radio quality information.

A radio base station according to an exemplary aspect of the invention is a radio base station as a handover target of a mobile station, the radio base station including: a reception unit for receiving radio quality information between the mobile station and the radio base station as the handover target which is measured by the mobile station from a radio base station as a handover source of the mobile station when the mobile station is handed over from the radio base station as the handover source to the radio base station as the handover target; and a channel allocation unit for allocating a channel to the mobile station in accordance with the received radio quality information.

A recording medium according to an exemplary aspect of the invention is a recording medium having recorded thereon a program for causing a computer to execute an operation control method for a radio base station as a handover target of a mobile station, the program including: processing for receiving radio quality information between the mobile station and the radio base station as the handover target which is measured by the mobile station from a radio base station as a handover source of the mobile station when the mobile station is handed over from the radio base station as the handover source to the radio base station as the handover target; and processing for allocating a channel to the mobile station in accordance with the received radio quality information.

A mobile station according to an exemplary aspect of the invention is a mobile station in a mobile communication system in which the mobile station performs measurement of radio quality information between the mobile station and a radio base station as a handover target and transmits the radio quality information to a radio base station as a handover source, the radio base station as the handover source transmits the radio quality information to the radio base station as the handover target when the mobile station is handed over from the radio base station as the handover source to the radio base station as the handover target, and the radio base station as the handover target allocates a channel to the mobile station in accordance with the radio quality information received from the radio base station as the handover source, the mobile station including a unit for performing measurement of higher accuracy than the measurement and transmitting the result of measurement to the radio base station as the handover source in response to a request from the radio base station as the handover source to the mobile station for measurement of higher accuracy than the measurement.

A recording medium according to an exemplary aspect of the invention is a recording medium having recorded thereon a program for causing a computer to execute an operation control method for a mobile station in a mobile communication system in which the mobile station performs measurement of radio quality information between the mobile station and a radio base station as a handover target and transmits the radio quality information to a radio base station as a handover source, the radio base station as the handover source transmits the radio quality information to the radio base station as the handover target when the mobile station is handed over from the radio base station as the handover source to the radio base station as the handover target, and the radio base station as the handover target allocates a channel to the mobile station in accordance with the radio quality information received from the radio base station as the handover source, the program including processing for performing measurement of higher accuracy than the measurement and transmitting the result of measurement to the radio base station as the handover source in response to a request from the radio base station as the handover source to the mobile station for measurement of higher accuracy than the measurement.

A mobile communication system according to an exemplary aspect of the invention is a mobile communication system including a mobile station, a radio base station as a handover source of the mobile station, and a radio base station as a handover target of the mobile station, wherein the mobile station includes a first transmission unit for transmitting radio quality information between the mobile station and the radio base station as the handover target to the radio base station as the handover source; the radio base station as the handover source includes a second transmission unit for transmitting the radio quality information to the radio base station as the handover target before transmitting context information necessary for communication with the mobile station to the radio base station as the handover target; and the radio base station as the handover target includes a reception unit for receiving the radio quality information from the radio base station as the handover source, and a determination unit for determining whether it is possible to accept a handover of the mobile station based on the radio quality information.

A mobile communication system according to an exemplary aspect of the invention is a mobile communication system including a mobile station, a radio base station as a handover source of the mobile station, and candidate radio base stations for a handover target of the mobile station, wherein the mobile station includes a first transmission unit for transmitting radio quality information between the mobile station and the candidate radio base stations to the radio base station as the handover source; the radio base station as the handover source includes a second transmission unit for transmitting the radio quality information to the candidate radio base stations before deciding a handover of the mobile station from the radio base station as the handover source to any of the candidate radio base stations; and the candidate radio base stations each include a reception unit for receiving the radio quality information from the radio base station as the handover source, a determination unit for determining whether it is possible to accept the handover or not based on the radio quality information, and a third transmission unit for transmitting the result of the determination to the radio base station as the handover source.

A handover control method according to an exemplary aspect of the invention is a handover control method for a mobile communication system that includes a mobile station, a radio base station as a handover source of the mobile station, and a radio base station as a handover target of the mobile station, the method including: transmitting radio quality information between the mobile station and the radio base station as the handover target from the mobile station to the radio base station as the handover source; transmitting the radio quality information from the radio base station as the handover source to the radio base station as the handover target before transmitting context information necessary for communication with the mobile station to the radio base station as the handover target; receiving the radio quality information at the radio base station as the handover target from the radio base station as the handover source; and determining whether it is possible to accept a handover of the mobile station at the radio base station as the handover target based on the radio quality information.

A handover control method according to an exemplary aspect of the invention is a handover control method for a mobile communication system that includes a mobile station, a radio base station as a handover source of the mobile station, and candidate radio base stations for a handover target of the mobile station, the method including: transmitting radio quality information between the mobile station and the candidate radio base stations from the mobile station to the radio base station as the handover source; transmitting the radio quality information from the radio base station as the handover source to the candidate radio base stations before deciding a handover of the mobile station from the radio base station as the handover source to any of the candidate radio base stations; receiving the radio quality information from the radio base station as the handover source at the candidate radio base stations; determining whether it is possible to accept the handover or not based on the radio quality information at the candidate radio base stations; and transmitting the result of the determination from the candidate radio base stations to the radio base station as the handover source.

A radio base station according to an exemplary aspect of the invention is a radio base station as a handover target of a mobile station, the radio base station including: a reception unit for receiving radio quality information between the mobile station and the radio base station as the handover target which is measured by the mobile station from a radio base station as a handover source of the mobile station before receiving context information necessary for communication with the mobile station; and a determination unit for determining whether it is possible to accept a handover of the mobile station or not based on the radio quality information.

A radio base station according to an exemplary aspect of the invention is a radio base station as a handover source of a mobile station, the radio base station including: a unit for receiving radio quality information between the mobile station and a radio base station as a handover target of the mobile station which is measured by the mobile station; and a transmission unit for transmitting the radio quality information to the radio base station as the handover target before transmitting context information necessary for communication with the mobile station to the radio base station as the handover target; wherein the radio quality information is used for determining whether the radio base station as the handover target can accept the handover of the mobile station or not.

A radio base station according to an exemplary aspect of the invention is a candidate radio base station for a handover target of a mobile station, the candidate radio base station including: a reception unit for receiving radio quality information between the mobile station and the candidate radio base station which is measured by the mobile station from a radio base station as a handover source of the mobile station before decision of a handover of the mobile station from the radio base station as the handover source to the candidate radio base station; a determination unit for determining whether it is possible to accept the handover or not based on the radio quality information; and a transmission unit for transmitting the result of the determination to the radio base station as the handover source.

A radio base station according to an exemplary aspect of the invention is a radio base station as a handover source of a mobile station, the radio base station including: a reception unit for receiving radio quality information between the mobile station and candidate radio base stations for a handover target of the mobile station which is measured by the mobile station; and a transmission unit for transmitting the radio quality information to the candidate radio base stations before deciding a handover of the mobile station from the radio base station as the handover source to any of the candidate radio base stations; wherein the radio quality information is used for determining whether the candidate radio base stations can accept the handover of the mobile station or not.

A recording medium according to an exemplary aspect of the invention is a recording medium having recorded thereon a program for causing a computer to execute an operation control method for a radio base station as a handover target of a mobile station, the program including: processing for receiving radio quality information between the mobile station and the radio base station as the handover target which is measured by the mobile station from a radio base station as a handover source of the mobile station before receiving context information necessary for communication with the mobile station; and processing for determining whether it is possible to accept a handover of the mobile station or not based on the radio quality information.

A recording medium according to an exemplary aspect of the invention is a recording medium having recorded thereon a program for causing a computer to execute an operation control method for a radio base station as a handover source of a mobile station, the program including: processing for receiving radio quality information between the mobile station and a radio base station as a handover target of the mobile station which is measured by the mobile station; and processing for transmitting the received radio quality information, which will be used for determining whether the radio base station as the handover target can accept the handover of the mobile station or not, to the radio base station as the handover target before transmitting context information necessary for communication with the mobile station to the radio base station as the handover target.

A recording medium according to an exemplary aspect of the invention is a recording medium having recorded thereon a program for causing a computer to execute an operation control method for a candidate radio base station for a handover target of a mobile station, the program including: processing for receiving radio quality information between the mobile station and the candidate radio base station which is measured by the mobile station from a radio base station as a handover source of the mobile station before decision of a handover of the mobile station from the radio base station as the handover source to the candidate radio base station; processing for determining whether it is possible to accept the handover or not based on the radio quality information; and processing for transmitting the result of the determination to the radio base station as the handover source.

A recording medium according to an exemplary aspect of the invention is a recording medium having recorded thereon a program for causing a computer to execute an operation control method for a radio base station as a handover source of a mobile station, the program including: processing for receiving radio quality information between the mobile station and a candidate radio base station for a handover target of the mobile station which is measured by the mobile station; and processing for transmitting the received radio quality information, which will be used for determining whether the candidate radio base station can accept the handover, to the candidate radio base station before deciding a handover of the mobile station from the radio base station as the handover source to the candidate radio base station.

A communication system according to an exemplary aspect of the invention is a mobile communication system including a mobile station, a radio base station as a handover source of the mobile station, a radio base station as a handover target of the mobile station, a first radio base station controller for controlling the radio base station as the handover source, and a second radio base station controller for controlling the radio base station as the handover target, wherein the mobile station includes a transmission unit for transmitting radio quality information between the mobile station and the radio base station as the handover target to the first radio base station controller via the radio base station as the handover source; the first radio base station controller includes a transmission unit for transmitting the radio quality information to the second radio base station controller before transmitting context information necessary for communication with the mobile station to the radio base station as the handover target; the second radio base station controller includes a reception unit for receiving the radio quality information from the first radio base station controller, and a determination unit for determining whether it is possible to accept a handover of the mobile station based on the radio quality information.

A mobile communication system according to an exemplary aspect of the invention is a mobile communication system including a mobile station, a radio base station as a handover source of the mobile station, a candidate radio base station for a handover target of the mobile station, a first radio base station controller for controlling the radio base station as the handover source, and a second radio base station controller for controlling the candidate radio base station, wherein the mobile station includes a transmission unit for transmitting radio quality information between the mobile station and the candidate radio base station to the first radio base station controller via the radio base station as the handover source; the first radio base station controller includes a transmission unit for transmitting the radio quality information to the second radio base station controller before deciding a handover of the mobile station from the radio base station as the handover source to the candidate radio base station; and the second radio base station controller includes a reception unit for receiving the radio quality information from the first radio base station controller, and a determination unit for determining whether it is possible to accept the handover based on the radio quality information.

BRIEF DESCRIPTION OF THE DRAWINGS

FIG. 3 shows the configuration of a Target eNodeB of FIG. 1;

FIG. 4 shows the configuration of a UE of FIG. 1;

FIG. 12 is a sequence diagram illustrating a handover sequence of a related art; and FIG. 13 is a sequence diagram illustrating a ping-pong phenomenon.

DETAILED DESCRIPTION OF THE EXEMPLARY EMBODIMENTS

The exemplary embodiments of the invention will be described below with reference to drawings.

Figure 1:
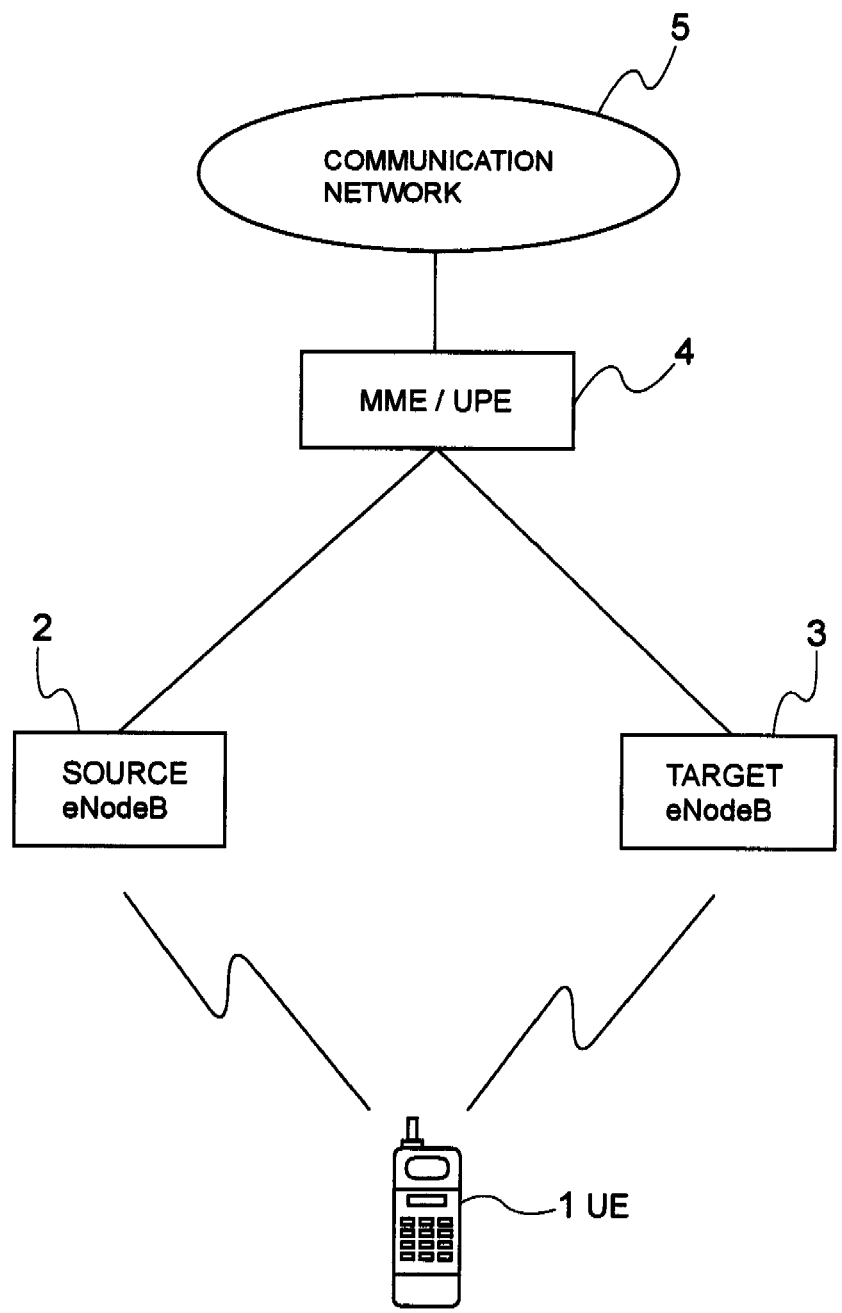
FIG. 1 shows the configuration of a mobile communication system according to a first exemplary embodiment of the invention.

FIG. 1 shows the configuration of a mobile communication system according to a first exemplary embodiment of the invention. In FIG. 1, a UE 1 is connected to a communication network 5 via a Mobility Management Entity (MME)/User Plane Entity (UPE) 4 which is an exchange accommodating a Source eNodeB 2, a Target eNodeB 3, and the UE 1.

The Source eNodeB 2 is a radio base station as the handover source with which the UE 1 currently establishes a radio link. The Target eNodeB 3 is a radio base station as the handover target with which the UE 1 is going to establish a radio link. The MME/UPE 4 is connected to the communication network 5.

Figure 2:
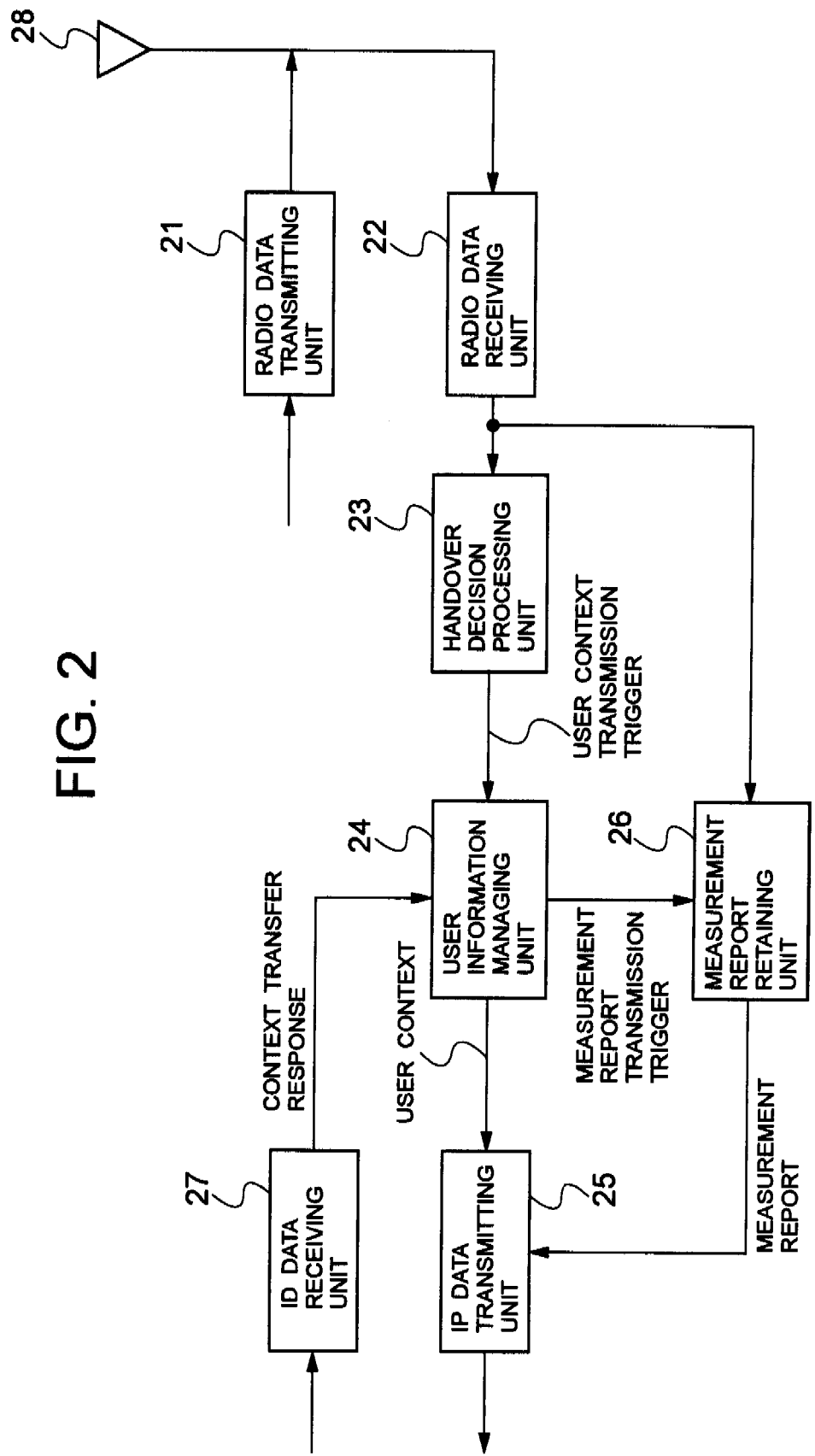
FIG. 2 shows the configuration of a Source eNodeB of FIG. 1.

FIG. 2 shows the configuration of the Source eNodeB 2 of FIG. 1. In FIG. 2, a radio data receiving unit 22 receives a Measurement Report from the UE 1, and transfers it to a handover decision processing unit 23 and a Measurement Report retaining unit 26. The handover decision processing unit 23 determines whether to carry out a handover based on the Measurement Report. If a handover is to be carried out, the handover decision processing unit 23 sends to a user information managing unit 24 a trigger for transmitting context information (user context) which is necessary for communication with the UE 1.

Upon receiving the transmission trigger from the handover decision processing unit 23, the user information managing unit 24 sends the context information to an Internet Protocol (IP) data transmitting unit 25. The IP data transmitting unit 25 converts the received context information into IP packets and transmits them to the Target eNodeB 3.

After radio resource for the UE 1 is reserved at the Target eNodeB 3 (after step S4 of FIG. 4, to be discussed later), the IP data receiving unit 27 receives a User Context Response from the Target eNodeB 3 (step S6 of FIG. 4, to be discussed later) and notifies the user information managing unit 24 of the response.

In response to the reception of the User Context Response, the user information managing unit 24 sends a Measurement Report transmission trigger to the Measurement Report retaining unit 26. The Measurement Report retaining unit 26 sends radio quality information between the UE 1 and the Target eNodeB 3 which is contained in Measurement Reports that have been accumulated until the reception of the transmission trigger to the IP data transmitting unit 25. The IP data transmitting unit 25 converts the received radio quality information into IP packets and transmits them to the Target eNodeB 3.

FIG. 3 shows the configuration of the Target eNodeB 3 of FIG. 1. In FIG. 3, a radio communication unit 31 communicates with the UE 1 via an antenna 36. A scheduling unit 32 performs scheduling processing for allocating a channel to the UE 1. An IP data communication unit 33 performs IF communication with the Source eNodeB 2. A control unit (CPU) 34 controls the operation of the radio communication unit 31, scheduling unit 32, and IP data communication unit 33 in accordance with a program prestored in memory 35.

While IP communication is used for communication between the Source eNodeB 2 and the Target eNodeB 3 in the description so far, the present exemplary embodiment is not limited to IP communication and may use other communication protocols.

FIG. 4 shows the configuration of the UE 1 of FIG. 1. In FIG. 4, a radio communication unit 11 communicates with the eNodeBs 2 and 3 via an antenna 16. A radio quality measuring unit 12 measures the radio quality between the UE 1 and each of neighboring radio base stations including the eNodeBs 2 and 3. A handover processing unit 13 performs handover processing for the UE 1 in accordance with directions from the Source eNodeB 2. A control unit (CPU) 14 controls the operation of the radio communication unit 11, radio quality measuring unit 12, and handover processing unit 13 in accordance with a program prestored in memory 15.

While the configuration of the present exemplary embodiment has been described thus far, detailed configurations of the UE 1, Source eNodeB 2, Target eNodeB 3, and MME/UPE 4 are omitted as they are well-known to those skilled in the art.

Figure 5:
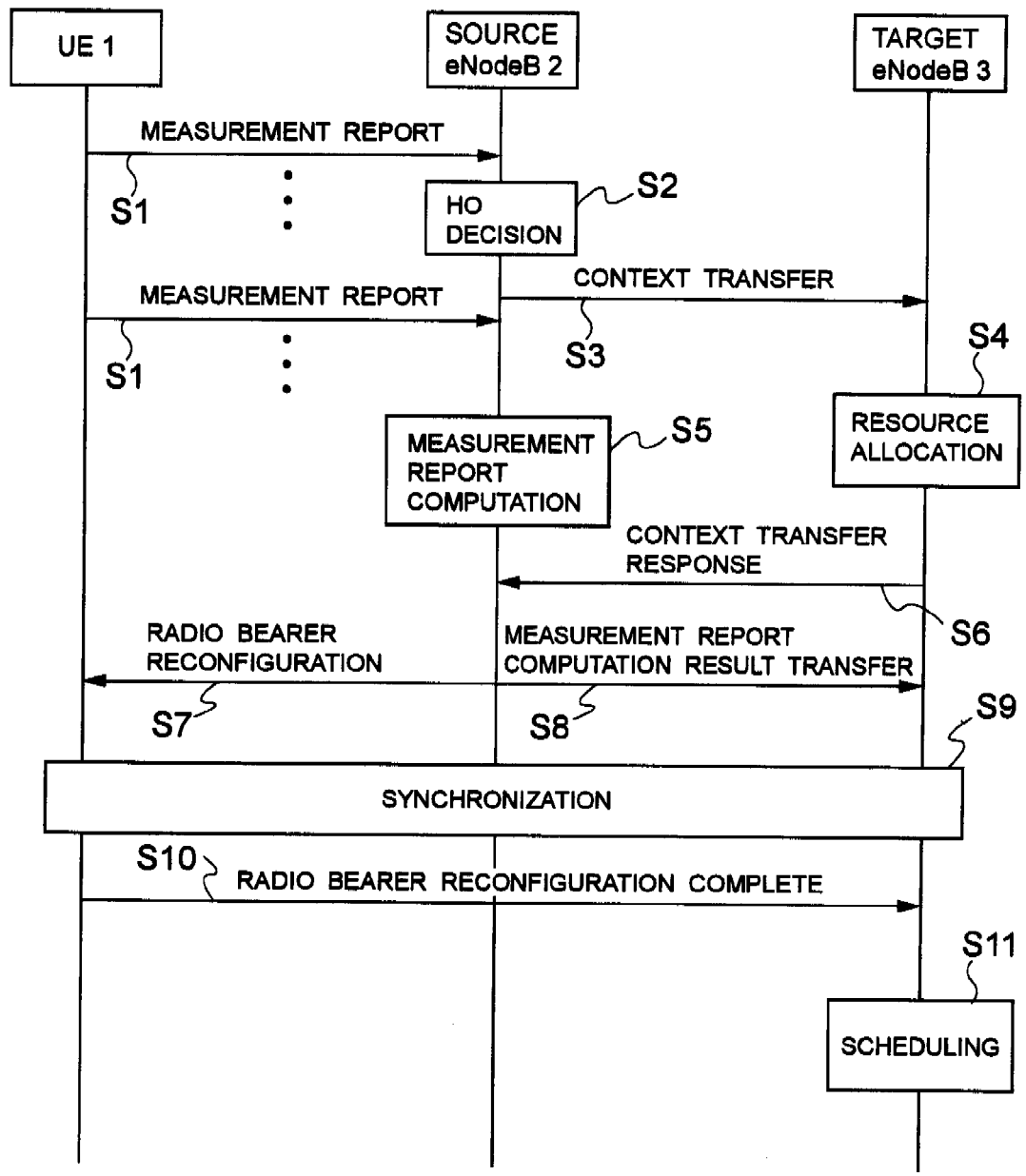
FIG. 5 is a sequence diagram illustrating the operation of the mobile communication system according to the first exemplary embodiment of the invention.

Next, the operation of the mobile communication system according to the first exemplary embodiment of the invention will be described using drawings. FIG. 5 is a sequence diagram illustrating the operation of the mobile communication system according to the first exemplary embodiment of the invention.

In the first exemplary embodiment of the invention, the Source eNodeB 2 notifies the Target eNodeB 3 of radio quality information between the UE 1 and the Target eNodeB 3 measured by the UE 1. The Target eNodeB 3 allocates a channel to the UE 1 in accordance with the radio quality information between the UE 1 and the Target eNodeB 3 notified by the Source eNodeB 2.

As just described, in the first exemplary embodiment of the invention, since radio quality information between the UE 1 and the Target eNodeB 3 measured by the UE 1 is transferred from the Source eNodeB 2 to the Target eNodeB 3 at the time of a handover, the Target eNodeB 3 can optimally allocate a channel in accordance with the radio quality.

The first exemplary embodiment of the invention will be described in detail.

In FIG. 5, the UE 1 periodically measures the radio quality between the UE 1 and neighboring eNodeBs, and periodically reports the result of measurement to the Source eNodeB 2 as a Measurement Report (Step S1). An example of the Measurement Report is RSCP (Received Signal Code Power) of a CPICH (Common Pilot Channel). Other examples are CRSP (Common Reference Symbol Power), CRSQ (Common Reference Symbol Quality), and RSSI (Received Signal Strength Indicator).

The Source eNodeB 2 determines whether to carry out a handover or not based on the Measurement Report from the UE 1 (step S2). If a handover is to be carried out, the Source eNodeB 2 notifies the Target eNodeB 3 of context information necessary for communication with the UE 1, and gives a trigger to reserve radio resource of the Target eNodeB 3 (step S3).

Upon receiving the context information, the Target eNodeB 3 determines whether there is available radio resource (step S4). If radio resource can be allocated to the UE 1, it notifies the Source eNodeB 2 of the completion of radio resource reservation (step S6).

Meanwhile, the Source eNodeB 2 periodically receives Measurement Reports from the UE 1, and performs averaging, for example, on radio quality information between the UE 1 and the Target NodeB 3 which is contained in the accumulated Measurement Reports (step S5). Furthermore, after receiving the notification that radio resource of the Target eNodeB 3 has been reserved, the Source eNodeB 2 notifies the Target eNodeB 3 of averaged radio quality information between the UE1 and the Target eNodeB 3 (step S8).

The Source eNodeB 2 may notify the Target eNodeB 3 of radio quality information between the UE 1 and the Target eNodeB 3 contained in the accumulated Measurement Reports as it is without averaging it, or may provide accumulated Measurement Reports themselves.

Also, upon receiving the notification that radio resource of the Target eNodeB 3 has been reserved, the Source eNodeB 2 notifies the UE 1 of parameters for use at the handover target (step S7). After the UE 1 receives the parameters for use at the handover target, the UE 1 and the Target eNodeB 3 perform operations for achieving synchronization (step S9). Then, after achieving synchronization, the UE 1 notifies the Target eNodeB 3 of completion of handover processing (step S10).

After the handover processing, the Target eNodeB 3 allocates a channel to the UE 1 in accordance with the radio quality information between the UE 1 and the Target eNodeB 3 notified by the Source eNodeB 2 (step S11). This channel allocation is performed according to a system policy. For example, the policy may be to allocate more radio resource to a UE with poor radio quality, or conversely, to allocate more radio resource to a UE with good radio quality.

Here, the channel allocated to the UE 1 in accordance with radio quality information may be a shared channel for HSDPA (High Speed Downlink Packet Access) and/or HSUPA (High Speed Uplink Packet Access). However, the present exemplary embodiment is not limited to this and is applicable to any channel in general to which radio resource can be allocated as appropriate. The radio resource is electric power and/or a frequency band, which may be defined according to the number of codes and/or a modulation method to be used.

Although the Source eNodeB 2 is configured to notify the Target eNodeB 3 of radio quality information between the UE 1 and the Target eNodeB 3 at step S8 after receiving a notification that radio resource of the Target eNodeB 3 has been reserved, steps S5 and S8 may be omitted by including radio quality information between the UE 1 and the Target eNodeB 3 into context information notified at step S3 for notification. The Source eNodeB 2 may also notify the Target eNodeB 3 of the radio quality information between the UE 1 and the Target eNodeB 3 at any point between immediately after step S2 and immediately before step S11.

The Source eNodeB 2 may also request measurement of higher accuracy than a Measurement Report from the UE 1 after a handover is decided at step S2, and notify the Target eNodeB 3 of the result of measuring the radio quality between the UE 1 and the Target eNodeB 3 based on higher-accuracy measurement provided from the UE 1. Measurement of higher accuracy than a Measurement Report may be Channel Quality Indicator (CQI) information (quality information for wideband) or a report with enhanced accuracy of measurement, such as shorter intervals of measurement than a normal Measurement Report.

Another possible system configuration is to deploy NodeBs in place of eNodeBs and deploy a Radio Network Controller (RNC) which is a radio base station controller for controlling the NodeBs as a high-level device in FIG. 1. In this case, the RNC makes a handover decision based on Measurement Reports received from the UE via the Source NodeB, and transfers the radio quality information between the UE and the Target NodeB to the Target NodeB.

As yet another system configuration, such a configuration is also possible that deploys base stations for other wireless access system, such as a wireless LAN, not limited to NodeBs. An eNodeB and a NodeB are both called a radio base station.

Next, a second exemplary embodiment of the invention will be described. In the second exemplary embodiment of the invention, the basic configuration of the mobile communication system is similar to that of the first exemplary embodiment, but the Source eNodeB 2 requests from the UE 1 radio quality information of higher accuracy than a Measurement Report. Moreover, the Source eNodeB 2 notifies the Target eNodeB 3 of radio quality information of high accuracy received from the UE 1. The Target eNodeB 3 allocates a channel to the UE 1 in accordance with the radio quality information of high accuracy between the UE 1 and the Target eNodeB 3 notified by the Source eNodeB 2.

As described above, in the second exemplary embodiment of the invention, the Source eNodeB 2 requests from the UE 1 measurement of higher accuracy than a normal Measurement Report and notifies the Target eNode B3 of the result of measuring radio quality with high accuracy. Accordingly, the Target eNodeB 3 can allocate a channel more appropriately than based on a Measurement Report.

The second exemplary embodiment of the invention will be described in detail.

Figure 6:
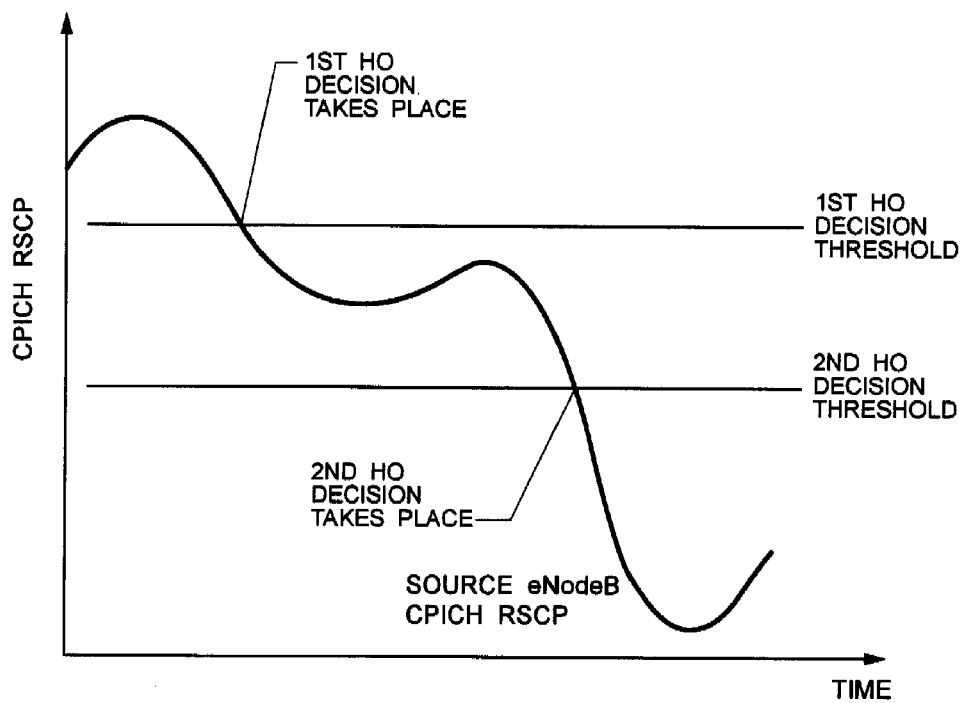
FIG. 6 illustrates HO decision in a second exemplary embodiment of the invention.

In the second exemplary embodiment, decision of a handover (HO decision) at step S2 of FIG. 5 is divided into two stages. The Source eNodeB 2 can request from the UE 1 measurement of the radio link quality between the UE 1 and the Target eNodeB 3 of higher accuracy in accordance with the decision at the first stage, and transfer context information to the Target eNodeB 3 in accordance with the decision at the second stage. FIG. 6 illustrates HO decision in the second exemplary embodiment of the invention, and FIG. 7 is a sequence diagram illustrating the operation of the mobile communication system according to the second exemplary embodiment of the invention.

In FIG. 6, the handover decision processing unit 23 of FIG. 2 has two-stage criteria of handover decision. More specifically, there are two-stage threshold values in handover decision processing input of which is radio quality information (e.g., CPICH RSCP information) between the UE 1 and the Source eNodeB 2 which is contained in a Measurement Report provided from the UE 1. The first HO decision (step S22 of FIG. 7) takes place when the radio quality information between the UE 1 and the Source eNodeB 2 is below a threshold value for the first-stage decision (1st HO Decision Threshold), and the second HO decision (step S25 of FIG. 7) takes place when the radio quality is further below a threshold value for the second-stage decision (2nd HO Decision Threshold).

Usually, a handover decision also uses radio quality information between the UE 1 and the Target eNodeB 3. In this case, handover decision processing has a third threshold value in addition to the two threshold values described above. In the first stage decision, the Source eNodeB 2 selects eNodeBs that have a radio quality above the third threshold value among values of radio quality between the UE 1 and eNodeBs contained in Measurement Reports as candidates for the Target eNodeB, and selects an eNodeB with the highest radio quality from among the candidate eNodeBs as the Target eNodeB in the second-stage decision.

Figure 7:
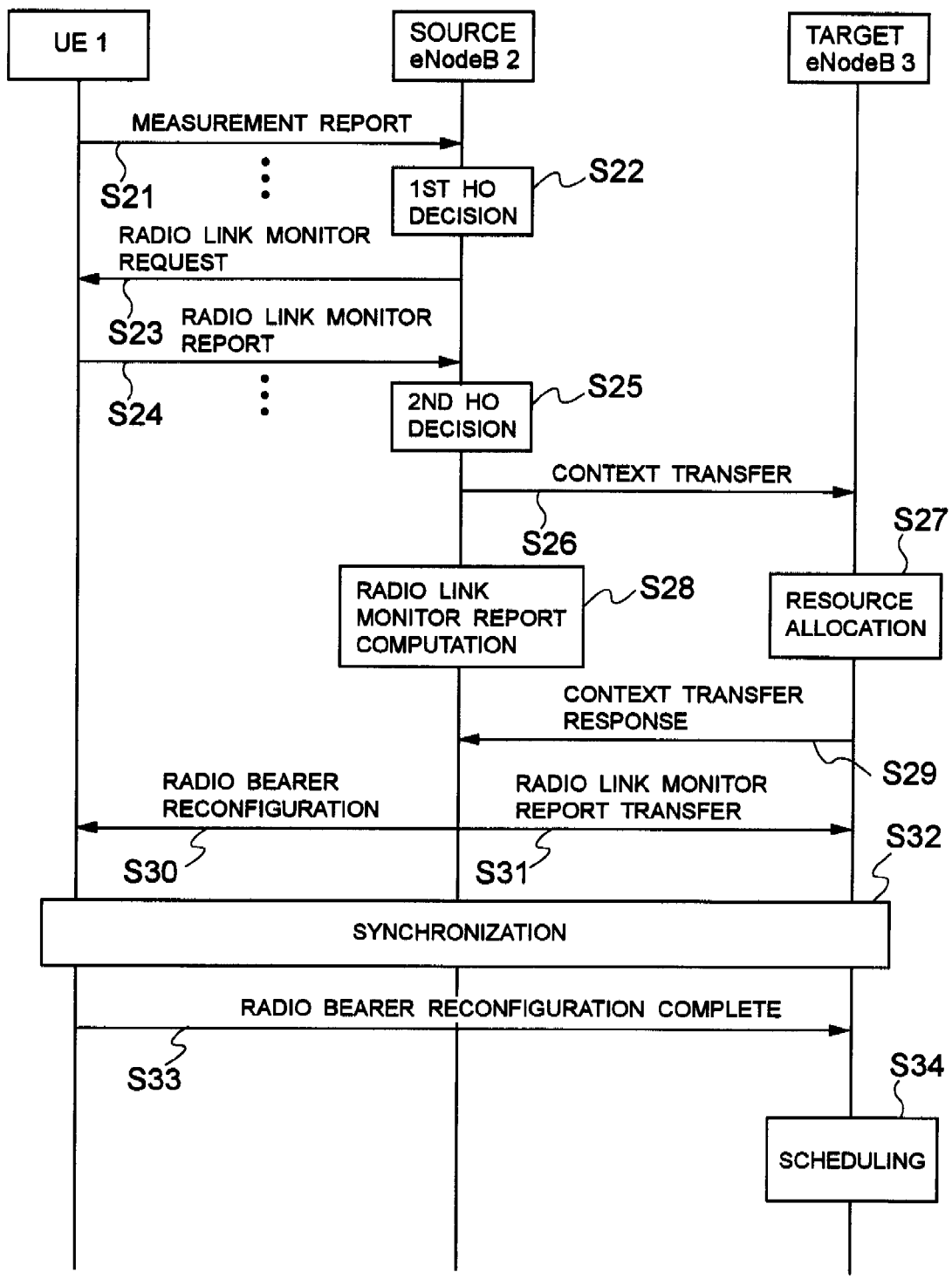
FIG. 7 is a sequence diagram illustrating the operation of the mobile communication system according to the second exemplary embodiment of the invention.

In FIG. 7, the Source eNodeB 2 determines whether the conditions of the first HO decision are satisfied based on the Measurement Report from the UE 1 (step S22). If the conditions are satisfied, the Source eNodeB 2 issues to the UE 1 a request for measuring the radio link quality of the Target eNodeB candidates (step S23).

The UE 1 reports the result of measuring the radio link quality between the UE 1 and each of the eNodeBs designated by the Source eNodeB 2 (i.e., candidates for the Target eNodeB) (step S24). For this measurement, CQI information (quality information for wideband) or a report with enhanced accuracy of measurement, such as shorter intervals of measurement than a normal Measurement Report, can be adopted. The Source eNodeB 2 may also request measurement of radio link quality for all eNodeBs at step S23 rather than limiting eNodeBs for measurement.

Subsequently, the Source eNodeB 2 makes a handover decision based on a Measurement Report from the UE 1 (step S25). If conditions of the second HO decision are satisfied, the Source eNodeB 2 notifies the Target eNodeB 3 of context information necessary for communication with the UE 1, and gives a trigger to reserve radio resource of the Target eNodeB 3 (step S26).

Upon receiving the context information, the Target eNodeB 3 determines whether there is available radio resource (step S27). If radio resource can be allocated to the UE 1, it notifies the Source eNodeB 2 of completion of radio resource reservation (step S29).

The Source eNodeB 2 periodically receives and accumulates a report for step S24 from the UE 1. The Source eNodeB 2 also performs averaging, for instance, on radio quality information between the UE 1 and the Target eNodeB 3 which is contained in accumulated reports (step S28). Furthermore, after receiving the notification that radio resource has been reserved from the Target eNodeB 3, the Source eNodeB 2 notifies the Target eNodeB 3 of averaged radio quality information between the UE 1 and the Target eNodeB 3 (step S31).

The Source eNodeB 2 may notify the Target eNodeB 3 of radio quality information between the UE 1 and the Target eNodeB 3 contained in accumulated reports as it is without averaging it, or may provide accumulated reports themselves.

Also, upon receiving the notification that radio resource has been reserved from the Target eNodeB 3, the Source eNodeB 2 notifies the UE 1 of parameters for use at the target of handover (step S30). After the UE 1 receives the parameters for use at the target of handover, the UE 1 and the Target eNodeB 3 perform operations for achieving synchronization (step S32). After achieving synchronization, the UE 1 notifies the Target eNodeB 3 of completion of handover processing (step S33).

After the handover processing, the Target eNodeB 3 allocates a channel to the UE 1 in accordance with the radio quality information between the UE 1 and the Target eNodeB 3 provided by the Source eNodeB 2 (step S34).

To simplify the sequence, the UE 1 may stop normal Measurement Reports after the first HO decision at step S22, and the Source eNodeB 2 may use the report on measurement of radio link quality at step S24 to make a handover decision at step S25.

Although the Source eNodeB 2 is configured to notify the Target eNodeB 3 of radio quality information between the UE 1 and the Target eNodeB 3 at step S31, steps S28 and S31 can be omitted by including radio quality information between the UE 1 and the Target eNodeB 3 into context information notified at step S26 for notification. The Source eNodeB 2 may also provide the radio quality information between the UE 1 and the Target eNodeB 3 at any point between immediately after step S25 and immediately before step S34.

As described above, in the second exemplary embodiment of the invention, a handover decision is made in two stages. In the course of this decision, the Source eNodeB 2 requests the UE 1 to perform measurement of higher accuracy than a normal Measurement Report, and notifies the Target eNodeB 3 of the result of measuring radio quality with higher accuracy after the handover decision. Consequently, the Target eNodeB 3 can allocate a channel more appropriately for radio quality.

Next, a third exemplary embodiment of the invention will be described. The basic configuration of the mobile communication system according to the third exemplary embodiment of the invention is as described above. In the third exemplary embodiment, the Source eNodeB 2 transmits a Measurement Report to the Target eNodeB 3 before transferring context information. The control unit 34 of the Target eNodeB 3 determines whether the Target eNodeB 3 can accept a handover based on radio quality information between the UE 1 and the Target eNodeB 3 received from the Source eNodeB 2 (i.e., determines whether or not the radio quality satisfies the quality criteria of the Target eNodeB 3).

As just described, since the Target eNodeB 3 determines whether it can accept a handover or not based on the radio quality information between the UE 1 and the Target NodeB 3 before completion of a handover in the third exemplary embodiment of the invention, it is possible to prevent a ping-pong phenomenon.

In addition, since the Source eNodeB 2 notifies the Target eNodeB 3 of radio quality information between the UE 1 and the Target eNodeB 3 before transferring context information, the Target eNodeB 3 can determine whether the Target eNodeB 3 can accept a handover before transfer of context information. Consequently, a ping-pong phenomenon can be prevented while saving resource involved in transfer from the Source eNodeB 2 to the Target eNodeB 3.

The third exemplary embodiment of the invention will be described in detail.

Figure 8:
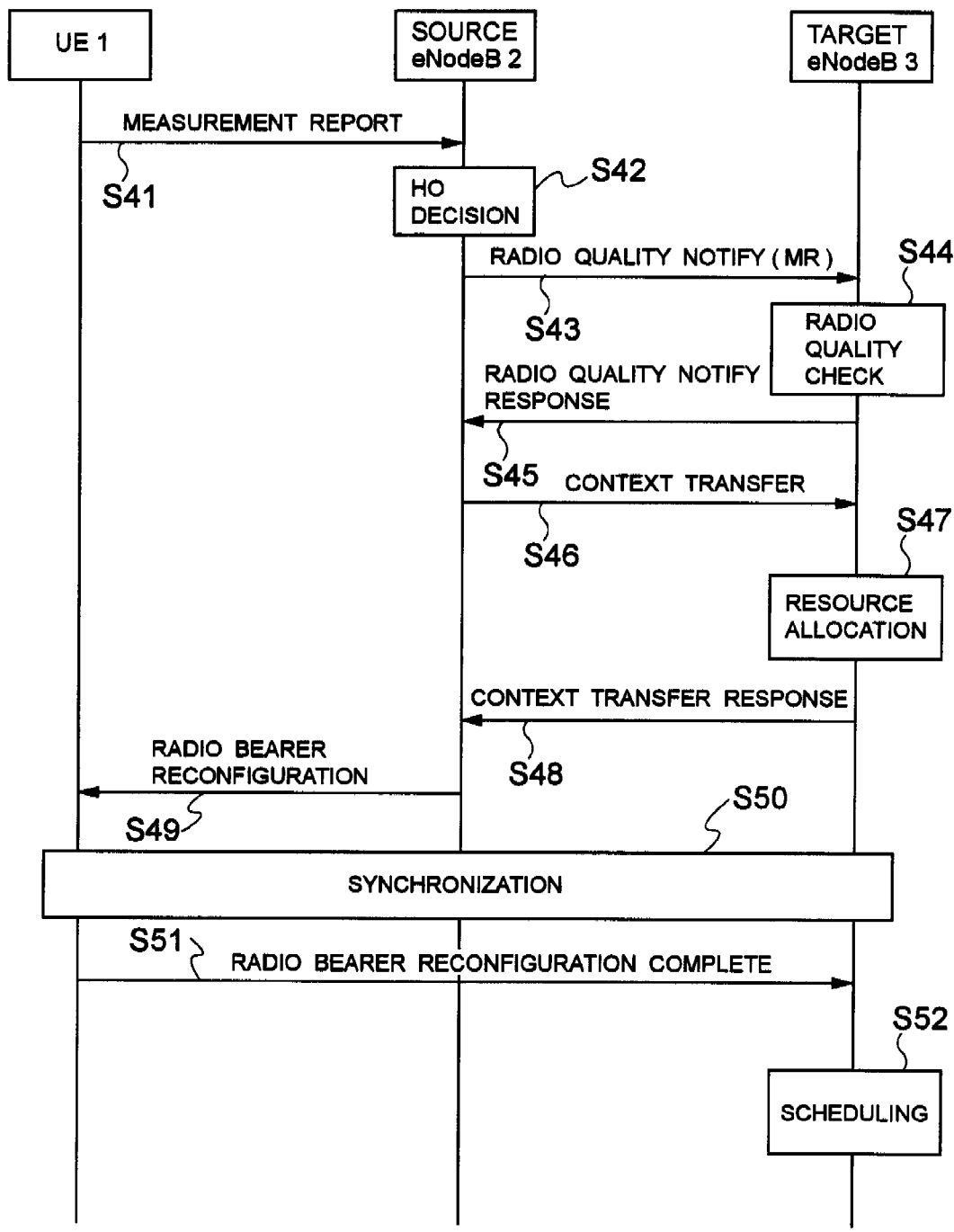
FIG. 8 is a sequence diagram illustrating the operation of the mobile communication system according to a third exemplary embodiment of the invention.

FIG. 8 is a sequence diagram illustrating the operation of the mobile communication system according to the third exemplary embodiment of the invention. In FIG. 8, the Source eNodeB 2 determines whether to carry out a handover or not (step S42) based on the Measurement Report received from the UE 1 (step S41). If a handover is to be carried out, the Source eNodeB 2 notifies the Target eNodeB 3 of radio quality information between the UE 1 and the Target eNodeB 3 which is contained in the Measurement Report before providing context information necessary for communication with the UE 1 (step S43).

By providing radio quality information between the UE 1 and the Target eNodeB 3 which is contained in the Measurement Report instead of the Measurement Report, it is possible to save resource involved in transfer from the Source eNodeB 2 to the Target eNodeB 3. In addition, since the Target eNodeB 3 does not have to extract information relating to itself from the Measurement Report, processing performed by the Target eNodeB 3 can be reduced. The Source eNodeB 2 may provide the Measurement Report to the Target eNodeB 3.

The Target eNodeB 3 determines whether it can accept a handover or not using the radio quality information between the UE 1 and the Target eNodeB 3 as well as a predetermined algorithm (step S44), and notifies the Source eNodeB 2 of the result (step S45). For example, when the radio quality information is below a predetermined threshold value and the Target eNodeB 3 determines that it cannot accept a handover, the Target eNodeB 3 notifies the Source eNodeB 2 to that effect at step S45. In this case, the Source eNodeB 2 stops the handover processing.

On the other hand, when the radio quality information is above the predetermined threshold value and the Target eNodeB 3 determines that it can accept a handover, the Target eNodeB 3 notifies the Source eNodeB 2 to that effect at step S45. In this case, the Source eNodeB 2 notifies the Target eNodeB 3 of context information necessary for communication with the UE 1 and gives a trigger to reserve radio resource of the Target eNodeB 3 (step S46).

Upon receiving the context information, the Target eNodeB 3 determines whether there is available radio resource (step S47). If radio resource can be allocated to the UE 1, the Target eNodeB 3 notifies the Source eNodeB 2 of completion of radio resource reservation (step S48). Then, the Source eNodeB 2 notifies the UE 1 of parameters for use at the target of handover (step S49). After the UE 1 receives the parameters for use at the target of handover, the UE 1 and the Target eNodeB 3 perform processing for achieving synchronization (step S50). After achieving synchronization, the UE 1 notifies the Target eNodeB 3 that handover processing is completed (step S51). Then, the Target eNodeB 3 allocates a channel to the UE 1 (step S52).

As in the first exemplary embodiment, the Source eNodeB 2 may additionally perform processing for steps S5 and S8 of FIG. 5. For example, the Source eNodeB 2 can notify the Target eNodeB 3 of radio quality information between the UE 1 and the Target eNodeB 3 which is contained in accumulated Measurement Reports after step S48. In addition, the Target eNodeB 3 can allocate a channel to the UE 1 in accordance with the radio quality information at step S52.

Also, each eNodeB present in the system may inform (or broadcast) other eNodeBs in advance (at a time before step S41, e.g., immediately after setup of the eNodeB) whether it performs determination processing as to whether it can accept a handover or not at step S44 when that eNodeB has become the Target eNodeB.

Next, a fourth exemplary embodiment of the invention will be described. In the fourth exemplary embodiment of the invention, the Source eNodeB 2 transmits radio quality information between the UE 1 and each of candidates for the Target eNodeB which is contained in a Measurement Report (step S61) to those candidates before making an HO decision. The Target eNodeB candidates determine whether they can accept a handover based on the received radio quality information, and send the result of determination to the Source eNodeB 2. Then, the Source eNodeB 2 selects the Target eNodeB based on the received results of determination.

In this way, in the fourth exemplary embodiment of the invention, since the Source eNodeB 2 can recognize eNodeBs that can accept a handover (i.e., whose radio quality with the UE 1 satisfies the quality criteria) in advance, a ping-pong phenomenon can be prevented without increasing the time required for a handover (i.e., the time between an HO decision and completion of a handover).

The fourth exemplary embodiment of the invention will be described in detail. The basic configuration of the mobile communication system according to the fourth exemplary embodiment is similar to that of the third exemplary embodiment.

Figure 9:
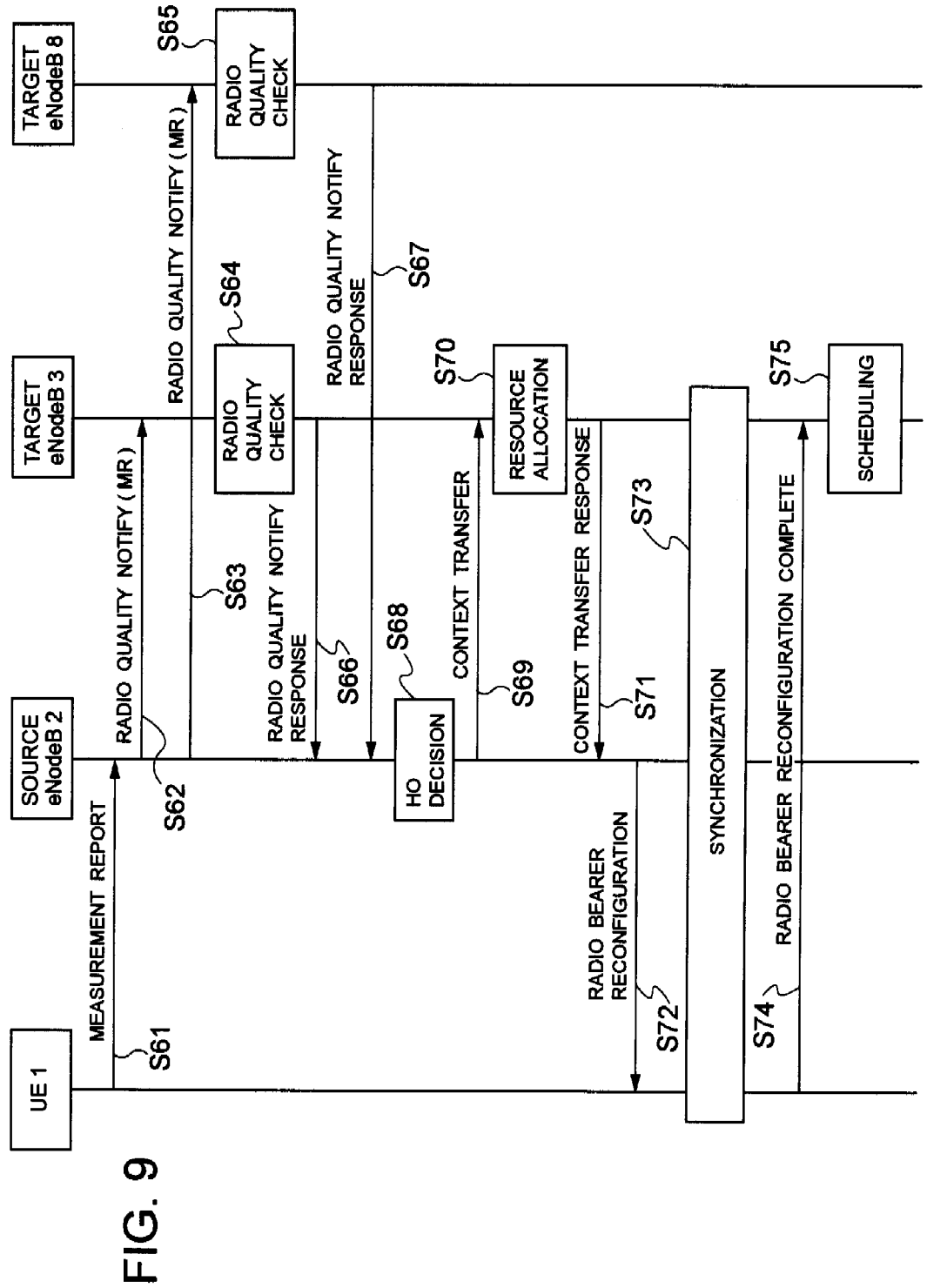
FIG. 9 is a sequence diagram illustrating the operation of the mobile communication system according to a fourth exemplary embodiment of the invention.

FIG. 9 is a sequence diagram illustrating the operation of the mobile communication system according to the fourth exemplary embodiment of the invention. In FIG. 9, the Source eNodeB 2 notifies each of Target eNodeB candidates 3 and 8 of radio quality information between the UE 1 and that candidate which is contained in a Measurement Report from the UE 1 (step S61) before making an HO decision (steps S62 and S63). Here, the Source eNodeB 2 may provide the Measurement Report itself to the Target eNodeB candidates 3 and 8.

The Source eNodeB 2 can select candidates for the Target eNodeB based on a Measurement Report. For example, an eNodeB that has radio quality exceeding a predetermined threshold value among values of radio quality between the UE 1 and eNodeBs contained in the Measurement Report is selected as a candidate for the Target eNodeB.

Each of the Target eNodeB candidates 3 and 8 determines whether it can accept a handover based on the radio quality information between the UE 1 and that candidate as at step S44 of FIG. 8 (steps S64 and S65), and notifies the Source eNodeB 2 of the result (steps S66 and S67).

Then, the Source eNodeB 2 determines whether to carry out a handover or not based on the Measurement Report from the UE 1 (step S68). That is, when the radio quality between the UE 1 and the Source eNodeB 2 is below the threshold value for HO decision, the Source eNodeB 2 selects the Target eNodeB from among Target eNodeB candidates that have determined they can accept a handover (step S68). For example, the Source eNodeB 2 selects a candidate that has the best radio quality as the Target eNodeB. It is assumed in FIG. 9 that the eNodeB 3 is selected as the Target eNodeB.

The Source eNodeB 2 notifies the Target NodeB 3 of context information necessary for communication with the UE 1 and gives a trigger to reserve radio resource of the Target eNodeB 3 (step S69). As steps S70 through S75 are similar to S47 through S52 of FIG. 8, description of them is omitted.

The Source eNodeB 2 can also periodically receive Measurement Reports from the UE 1 and periodically select candidates for the Target eNodeB based on the received Measurement Reports. The Source eNodeB 2 may also periodically notify Target eNodeB candidates of Measurement Reports or radio quality information between the UE 1 and each of the candidates which is contained in the Measurement Reports. In this case, the candidates for the Target eNodeB determine whether they can accept a handover or not every time they receive the notification, and notify the Source eNodeB 2 of the result of determination as a Radio Quality Notify Response. Then, the Source eNodeB 2 selects the Target eNodeB using the latest Radio Quality Notify Response when a handover is required.

The Source eNodeB 2 may notify candidates for the Target eNodeB of a Measurement Report or radio quality information between the UE 1 and the candidates which is contained in the Measurement Report when load on the Source eNodeB 2 has become large. Here, the load becomes large when available radio resource has fallen below a predetermined threshold value, for example.

Each eNodeB present in the system may inform (or broadcast) other eNodeBs in advance (at a time before step S61, e.g., immediately after setup of the eNodeB) whether it performs determination as to whether it can accept a handover or not at steps S64 and S65 when it has become a candidate for the Target eNodeB.

Figure 10:
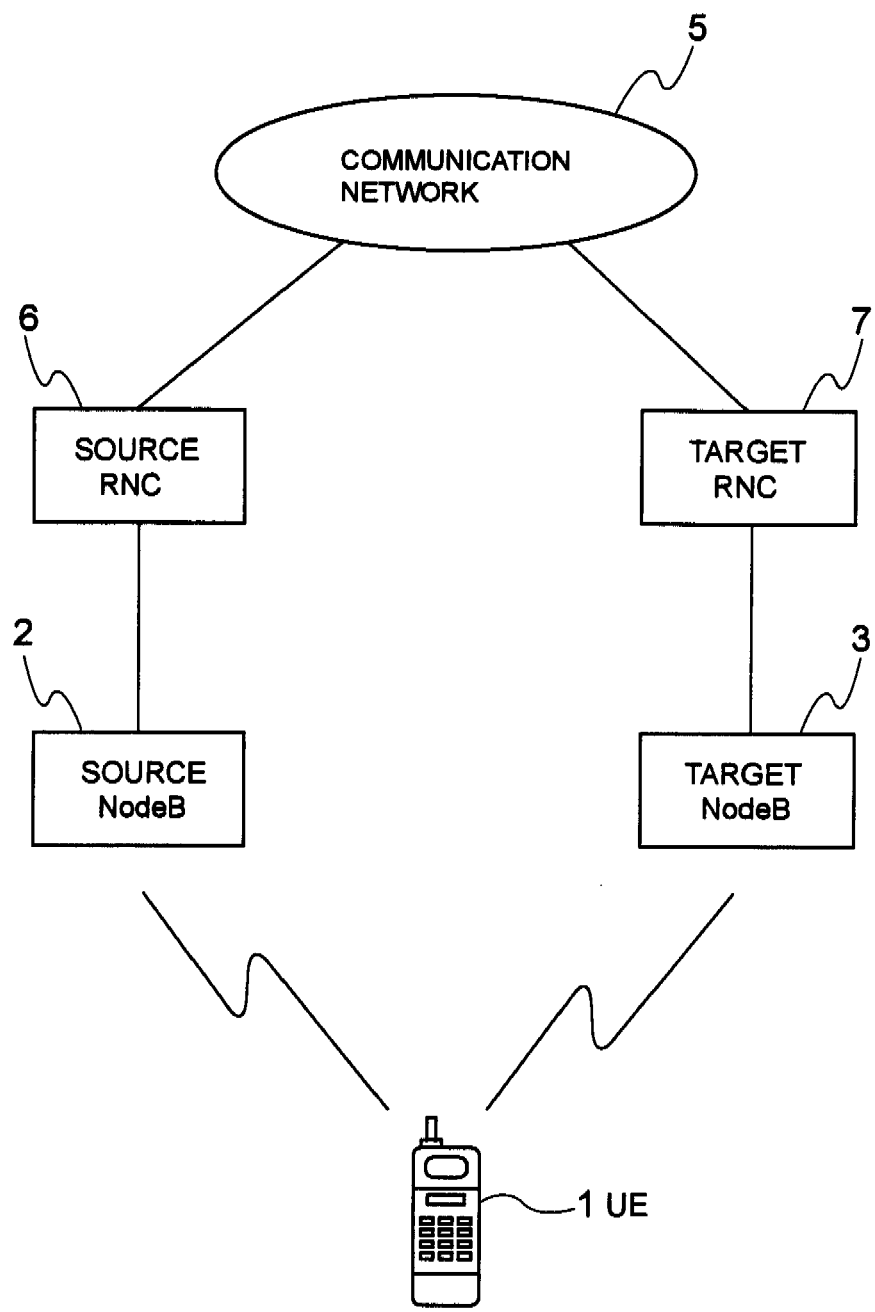
FIG. 10 shows the configuration of the mobile communication system according to a fifth exemplary embodiment of the invention.

The third and fourth exemplary embodiments of the invention can be applied to a system configuration which deploys NodeBs in place of eNodeBs and deploys an RNC for controlling the NodeBs as a high-level device. FIG. 10 shows the configuration of the mobile communication system according to a fifth exemplary embodiment of the invention, wherein a Source RNC 6 is provided as a high-level device for the Source NodeB 2 and a Target RNC 7 is provided as a high-level device for the Target NodeB 3.

Figure 11:
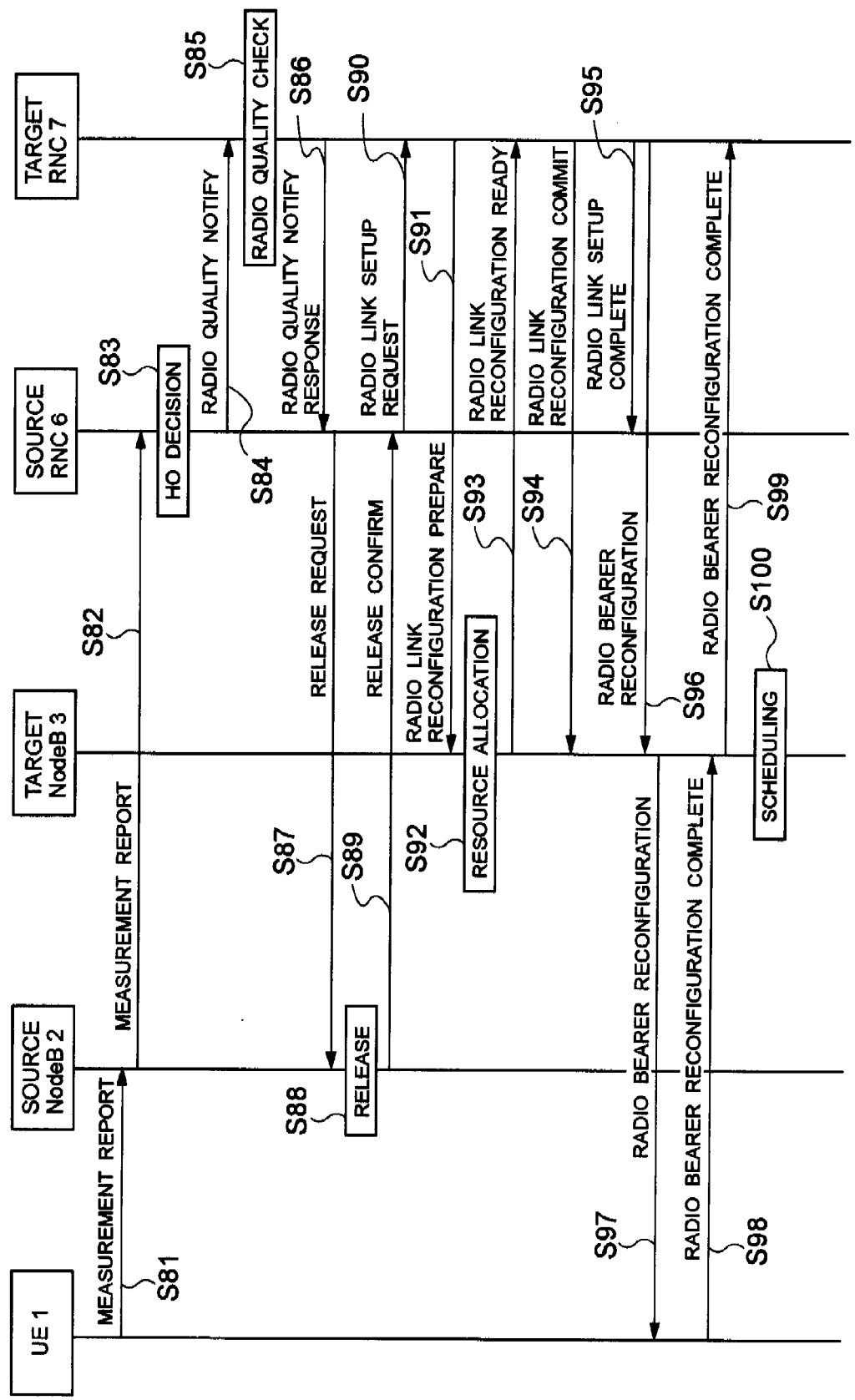
FIG. 11 is a sequence diagram illustrating the operation of the mobile communication system according to the fifth exemplary embodiment of the invention.

FIG. 11 is a sequence diagram illustrating the operation of the mobile communication system according to the fifth exemplary embodiment of the invention, showing the operation for a case the third exemplary embodiment of the invention is applied to the system configuration of FIG. 10. In FIG. 11, the Source RNC 6 determines whether to carry out a handover or not (step S83) based on a Measurement Report received from the UE 1 via the Source NodeB 2 (steps S81 and S82).

When a handover is to be carried out, the Source RNC 6 notifies the Target RNC 7 of radio quality information between the UE 1 and the Target NodeB 3 which is contained in the Measurement Report before providing context information (step S84). The Source RNC 6 may notify the Target RNC 7 of the Measurement Report.

The Target RNC 7 determines whether it can accept a handover or not based on the radio quality information between the UE 1 and the Target NodeB 3 (step S85), and notifies the Source RNC 6 of the result (step S86). If it cannot accept a handover, the Source RNC 6 stops handover processing. On the other hand, when it can accept a handover, the Source RNC 6 has the channel between the UE 1 and the Source NodeB 2 be released (steps S87 through S89). Thereafter, it notifies the Target NodeB 3 of context information necessary for communication with the UE 1 via the Target RNC 7 (steps S90 and S91).

The Target NodeB 3 reserves radio resource (step S92), and notifies the Target RNC 7 of the reservation (step S93). The Target RNC 7 requests the Target NodeB 3 to set up a radio link to the UE 1 (steps S94 to S97). When processing for achieving synchronization is consequently performed between the UE 1 and the Target NodeB 3, The UE 1 notifies the Target RNC 7 of completion of handover processing via the Target NodeB 3 (steps S98 and S99). The Target NodeB 3 allocates a channel to the UE 1 (step S100).

Although the above description is for a case where the third exemplary embodiment of the invention is applied to the system configuration of FIG. 10, it goes without saying that the fourth exemplary embodiment of the invention can be similarly applied to the system configuration of FIG. 10. In this case, the Source RNC 6 selects candidates for the Target NodeB based on a Measurement Report, and performs notification at steps S62 and S63 of FIG. 9 to RNCs controlling the selected candidates for the Target NodeB. Then, in response to the notification, the RNCs make determination of whether it is possible to accept a handover at steps S64 and S65 of FIG. 9 and notify the Source RNC 6 of the result. The Source RNC 6 selects the Target NodeB from among Target NodeB candidates that have been determined to be able to accept a handover in a similar manner to step S68 of FIG. 9, and transfers context information to the Target NodeB. Subsequent operations are similar to steps S92 to S100 of FIG. 11.

Notification of various kinds of information between radio base stations and RNCs may also be called transmission of various kinds of information. Similarly, report of Measurement Reports and/or the result of measuring radio link quality from a UE to a radio base station may also be called transmission of Measurement Reports and/or the result of measuring radio link quality.

The processing operations of the UE, eNodeB, NodeB, and RNC in accordance with the sequence diagrams shown in FIGS. 5, 7 through 9, and 11 can be realized by having a program prestored in a storage medium, such as ROM, be read and executed by a computer as a CPU (or control unit) on each of the apparatuses.

According to a sixth exemplary embodiment of the present invention, in a mobile communication system that includes a mobile station, a radio base station as the handover source of the mobile station, and a radio base station as the handover target of the mobile station, when the mobile station is handed over, the radio base station as the handover source transmits radio quality information between the mobile station and the radio base station as the handover target to the radio base station as the handover target, and the radio base station as the handover target allocates a channel to the mobile station in accordance with the radio quality information from the radio base station as the handover source.

According to a seventh exemplary embodiment of the present invention, in a mobile communication system that includes a mobile station, a radio base station as the handover source of the mobile station, and a radio base station as the handover target of the mobile station, the radio base station as the handover source transmits radio quality information between the mobile station and the radio base station as the handover target which is measured by the mobile station to the radio base station as the handover target before transmitting context information to the radio base station as the handover target, and the radio base station as the handover target determines whether it can accept the handover of the mobile station based on the radio quality information from the radio base station as the handover source.

According to an eighth exemplary embodiment of the present invention, in a mobile communication system that includes a mobile station, a radio base station as the handover source of the mobile station, and a candidate radio base station for the handover target of the mobile station, the radio base station as the handover source transmits to the candidate radio base station radio quality information between the mobile station and the candidate radio base station measured by the mobile station before deciding the handover of the mobile station from the radio base station as the handover source to the candidate radio base station, and the candidate radio base station determines whether it can accept the handover of the mobile station based on the radio quality information from the radio base station as the handover source.

The present invention provides a first exemplary advantage of improving the correctness of channel allocation to a mobile station at a radio base station as a handover target, by transferring radio quality information between the mobile station and the radio base station as the handover target measured by the mobile station from a radio base station as a handover source to the radio base station as the handover target at the time of a handover, and the radio base station as the handover target allocating a channel based on the transferred radio quality information.

The present invention provides a second exemplary advantage of preventing the occurrence of a ping-pong phenomenon either by a radio base station as a handover target determining whether it can accept a handover or not before completion of the handover based on radio quality information between a mobile station and itself measured by the mobile station, or by a candidate radio base station for the handover target of the mobile station determining whether it can accept a handover or not based on radio quality information between the mobile station and that candidate radio base station which is measured by the mobile station before a radio base station as a handover source decides a handover.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. A mobile communication system comprising a mobile station, a radio base station as a handover source of the mobile station, and a radio base station as a handover target of the mobile station, wherein the mobile station comprises a first transmission unit that transmits to the base station as the handover source, measurement reports including first radio quality information between the mobile station and the radio base station as the handover target, the radio base station as the handover source which averages the first radio quality information included in the measurement reports received from the mobile station to provide an averaged radio quality information and comprises a second transmission unit that transmits the averaged radio quality information to the radio base station as the handover target after the radio base station as the handover source determines that the mobile station is to be handed over from the radio base station as the handover source to the radio base station as the handover target, and the radio base station as the handover target comprises a reception unit that receives the context information from the radio base station as the handover source, wherein the radio quality information is measured by the mobile station, wherein the radio base station as the handover source configured to request the mobile station to send a second radio quality information, wherein an accuracy of the second radio quality information is higher than that of the first radio quality information, and wherein the radio base station as the handover source transmits a context information to the radio base station as the handover target, after the radio base station as the handover source transmits the averaged radio quality information to the radio base station as the handover target.

2. The mobile communication system according to claim 1, wherein the radio base station as the handover source transmits, to the radio base station as the handover target, a context information which includes the averaged radio quality information.

3. The mobile communication system according to claim 1, wherein the first radio quality information includes at least one of RSCP (Received Signal Code Power), CRSP (Common Reference Symbol Power), CRSQ (Common Reference Symbol Quality) or RSSI (Received Signal Strength Indicator).

4. A mobile communication system comprising a mobile station, a radio base station as a handover source of the mobile station, and candidate radio base stations for a handover target of the mobile station, wherein the mobile station comprises a first transmission unit that transmits, to the radio base station as the handover source, measurement reports including first radio quality information between the mobile station and the candidate radio base stations, the radio base station as the handover source which averages the first radio quality information included in the measurement reports received from the mobile station to provide an averaged radio quality information and comprises a second transmission unit that transmits the averaged radio quality information to the candidate radio base stations, before the radio base station as the handover source determines a handover of the mobile station from the radio base station as the handover source to any one of the candidate radio base stations as a handover target, and the candidate radio base stations comprise a reception unit that receives the averaged radio quality information from the radio base station as the handover source, wherein the radio base station as the handover source configured to request the mobile station to send a second radio quality information, wherein an accuracy of the second radio quality information is higher than that of the first radio quality information, and wherein the radio base station as the handover source transmits a context information to the candidate radio base stations, after the radio base station as the handover source transmits the averaged radio quality information to the candidate radio base stations.

5. The mobile communication system according to claim 4, wherein the first radio quality information includes at least one of RSCP (Received Signal Code Power), CRSP (Common Reference Symbol Power), CRSQ (Common Reference Symbol Quality) or RSSI (Received Signal Strength Indicator).

6. A method for radio base station as a handover source of a mobile station, the method comprising:

receiving, from the mobile station, a measurement reports including first radio quality information between the mobile station and a radio base station as the handover target, averaging the first radio quality information included in the measurement reports received from the mobile station to provide an averaged radio quality information, transmitting the averaged radio quality information to the radio base station as the handover target, after the radio base station as the handover source determines that the mobile station is to be handed over from the radio base station as the handover source to the radio base station as the handover target, wherein the method further comprises requesting the mobile station to send a second radio quality information, wherein an accuracy of the second radio quality information is higher than that of the first radio quality information, wherein the radio base station as the handover source transmits a context information to the radio base station as the handover target, after the radio base station as the handover source transmits the averaged radio quality information to the radio base station as the handover target.

7. The method according to claim 6, wherein the radio base station as the handover source transmits, to the radio base station as the handover target, a context information which includes the averaged radio quality information.

8. The method according to claim 6, further comprises transmitting a context information to the radio base station as the handover target, after transmitting the averaged radio quality information to the radio base station as the handover target.

9. The method according to claim 6, wherein the first radio quality information includes at least one of RSCP (Received Signal Code Power), CRSP (Common Reference Symbol Power), CRSQ (Common Reference Symbol Quality) or RSSI (Received Signal Strength Indicator).

10. A method for a radio base station as a handover source of the mobile station, the method comprising:

receiving, from the mobile station, measurement reports including first radio quality information between the mobile station and candidate radio base stations for a handover target of the mobile station, averaging the first radio quality information included in the measurement reports received from the mobile station to provide an averaged radio quality information, transmitting the averaged radio quality information to the candidate radio base stations, before the radio base station as the handover source determines a handover of the mobile station from the radio base station as the handover source to any one of the candidate radio base stations as a handover target, wherein the method further comprises requesting the mobile station to send a second radio quality information, wherein an accuracy of the second radio quality information is higher than that of the first radio quality information, wherein the radio base station as the handover source transmits a context information to the candidate radio base stations, after the radio base station as the handover source transmits the averaged radio quality information to the candidate radio base stations.

11. The method according to claim 10, wherein the first radio quality information includes at least one of RSCP (Received Signal Code Power), CRSP (Common Reference Symbol Power), CRSQ (Common Reference Symbol Quality) or RSSI (Received Signal Strength Indicator).

* * * * *